US007739187B2

(12) United States Patent
Watts et al.

(10) Patent No.: US 7,739,187 B2
(45) Date of Patent: Jun. 15, 2010

(54) METHOD AND SYSTEM FOR MODELING VOLATILITY

(75) Inventors: Martin R. Watts, Surrey (GB); Luke Halestrap, London (GB); Lionnel Pradier, London (GB); Julia Chislenko, New York, NY (US); Pawel M. Lewicki, Summit, NJ (US); Ronald Levin, Jerusalem (IL)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 12/437,070

(22) Filed: May 7, 2009

(65) Prior Publication Data
US 2009/0216673 A1    Aug. 27, 2009

Related U.S. Application Data

(63) Continuation of application No. 10/696,546, filed on Oct. 28, 2003, now abandoned, which is a continuation of application No. 09/811,790, filed on Mar. 19, 2001, now abandoned.

(60) Provisional application No. 60/190,610, filed on Mar. 20, 2000.

(51) Int. Cl.
 *G06Q 40/00* (2006.01)
(52) U.S. Cl. .......................... 705/37; 705/35
(58) Field of Classification Search .............. 705/35–45
See application file for complete search history.

(56) References Cited

U.S. PATENT DOCUMENTS

| 3,673,521 | A  | * | 6/1972 | Yuguchi ................. | 333/28 R |
| 6,263,321 | B1 | * | 7/2001 | Daughtery, III .......... | 705/36 R |
| 6,456,982 | B1 | * | 9/2002 | Pilipovic ................ | 705/36 R |

OTHER PUBLICATIONS

Black-Scholes and Beyond. Option Pricing Models, Neil A. Chriss, pp. 343-349.*
Financial Engineering News, Dec. 1999, pp. 5.*
The Pricing of Options on Assets with Stochastic Volatilities, Journal of Finance, vol. 42, Jun. 1987.
Rates of Skew Risk Magazine, Jul. 1999.
Markov Interest Rate Models. Hagan & Woodward, 1996.
Equivalent Black Volatilities, Hagan & Woodward, 1998.
A Closed-Form Solution for Options with Stochastic Volatility, Heston, 1993.
Swaptions with a Smile, Risk Magazine, Aug. 1999.

* cited by examiner

*Primary Examiner*—James Kramer
*Assistant Examiner*—Rajesh Khattar
(74) *Attorney, Agent, or Firm*—Goodwin Procter LLP

(57) ABSTRACT

A method for determining the implied volatility of a swap option employs intuitive factors to arrive at a close approximation of volatility. The volatility curve is a convex shaped curve which more closely follows real market volatility than previous methods. The slope of the curve is provided by employing a premium model which allows for a correlation between rates and volatility. The convex shaped curve is arrived by assuming a lognormal distribution for the underlying volatility.

4 Claims, 4 Drawing Sheets

METHOD AND SYSTEM FOR MODELING VOLATILITY

CROSS-REFERENCE TO RELATED APPLICATIONS

This application is a continuation U.S. patent application Ser. No. 10/696,546, filed Oct. 28, 2003, which is a continuation oft U.S. patent application Ser. No. 09/811,790 filed Mar. 19, 2001, which claims priority to U.S. patent application No. 60/190,610 filed Mar. 20, 2000, which is incorporated herein by reference in its entirety.

FIELD OF THE INVENTION

The present invention relates to financial risk management. Particularly, the invention relates to modeling the volatility of a swap option.

BACKGROUND

Swap options are associated with a volatility. There are various methods of estimating the volatility of a swap instrument. The current standard method for pricing swaptions is the Black-Scholes formula. The Black model takes a single volatility as its input. The Black formula assumes that interest rates are lognormally distributed. Accordingly, as the strike rate (exercise rate) varies from the forward rate (the projection of future rates) in the Black formula, the resultant implied volatility remains constant. However, as market observations show, the implied volatility of an option changes as the strike rate moves away from the forward rate underlying the option. Therefore, there is a need for a method for properly valuating swap options while recognizing that the options sometimes have different strike and forward rates.

SUMMARY OF THE INVENTION

Accordingly, the present invention provides a method for valuating swap options that recognizes that implied Black volatilities vary when strike rates differ from forward rates. The method of the invention allows for a correlation between the forward rate and its volatility by employing the "q-model" (discussed below). The method employs two intuitive parameters, volatility of volatility and q, determined by a trader, to produce a model for the non-flat volatility curve.

The method includes providing the average volatility of the asset by employing market data and providing the volatility of volatility of the asset by employing historical data. The method further includes providing the type of distribution for the forward rate based on historical data. A volatility distribution graph is provided, based on the selected distribution type, the graph having volatility as the x-axis and probability as the y-axis. The method then divides the volatility distribution graph into a plurality of vertical slices, each of said slices corresponding to a volatility such that the integration of the graph over the volatility range corresponding to each slice provides a probability for the corresponding volatility. The method determines a stochastic volatility premium for each volatility by employing a volatility premium process. The method then weighs each premium from said determining of premium step by the probability associated with the corresponding volatility, as determined from the volatility distribution graph. Finally, the method sums all premiums associated with the volatilities to provide a premium for the option.

DETAILED DESCRIPTION

The method for pricing options in accordance with the invention will be discussed with reference to a stochastic distribution curve and corresponding flow diagram outlining a method for determining the volatility, and in turn the price, of swap options. Next, a model in accordance with the invention is compared to the Black model by illustrating the shape of typical volatility curves arrived at by each method.

One method for modeling the volatility of a swap option is by employing the Hull and White stochastic volatility model. The Hull and White model determines the price of option by creating a lognormal distribution of asset price variance. The Hull method shows that, in the absence of correlation between rates and variance, the price of a European option (fixed date of exercise) is the Black price integrated over the probability of distribution of the variance of the rate over the life of the option. The method of the present invention extends the Hull method by creating a lognormal distribution of the volatility instead of the variance and incorporating non-zero correlation between volatilities and rates.

Figure 1:
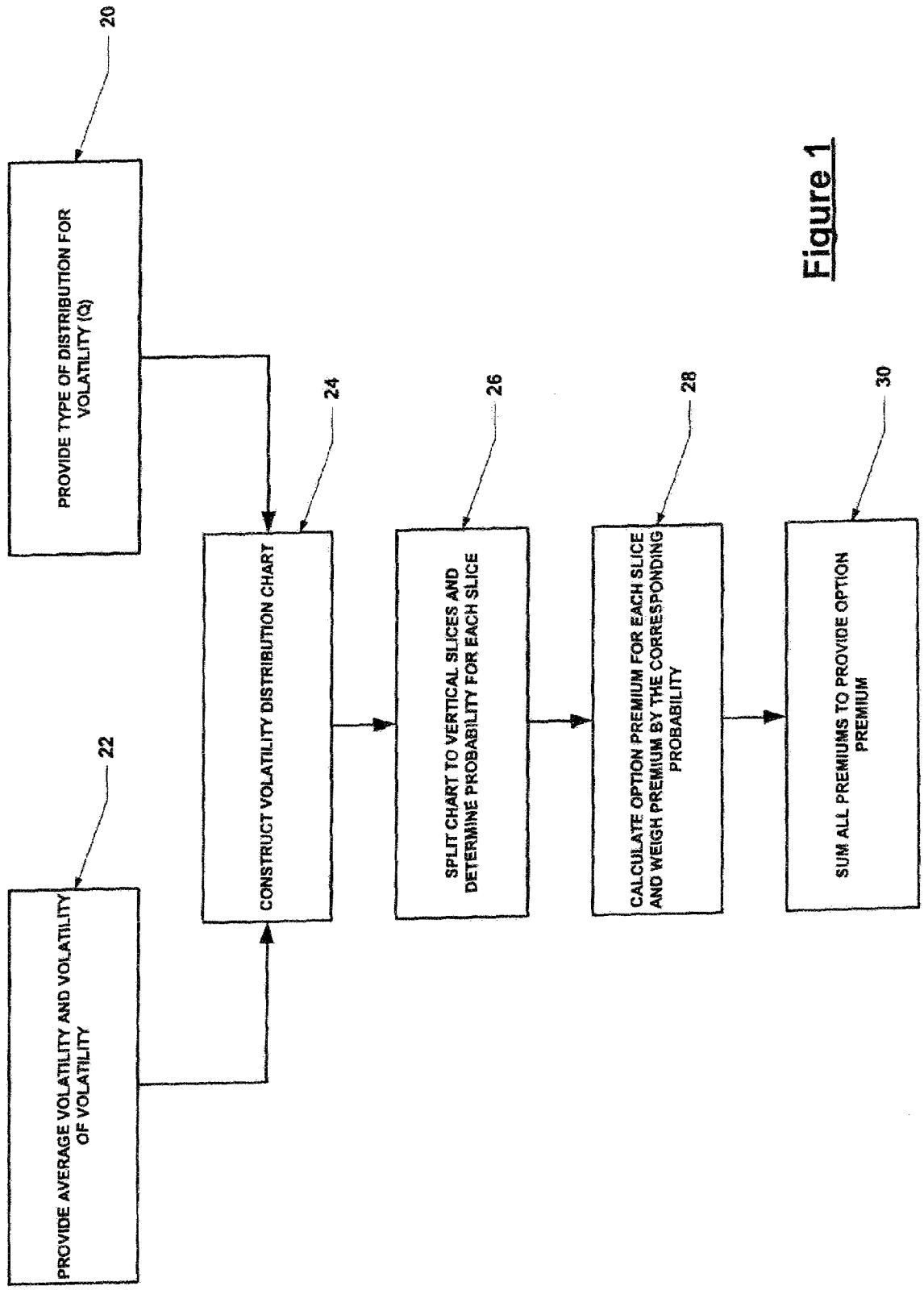
FIG. 1 is a flow diagram illustrating a process for determining a swap option volatility in accordance with the invention.

FIG. 1 is a flow diagram illustrating the process for pricing options in accordance with the invention. Average volatility as well as volatility of volatility are determined either by calibration to the values as seen in the market or by reference to historical data relating to the swap asset (Step 22). The historical data is preferably processed by a trader to determine the average volatility and volatility of volatility. One method for determining the average volatility is by using the existing implied volatility that is quoted in the market. One method for determining the volatility of volatility is by calculating a standard deviation from a history of implied volatility values. A trader preferably selects a distribution type for the volatility by employing historical data relating to the swap asset or by calibrating to the values implied in the market (Step 20). In one embodiment, the distribution type is selected by estimating the relationship from historical volatility and yield data.

Figure 2:
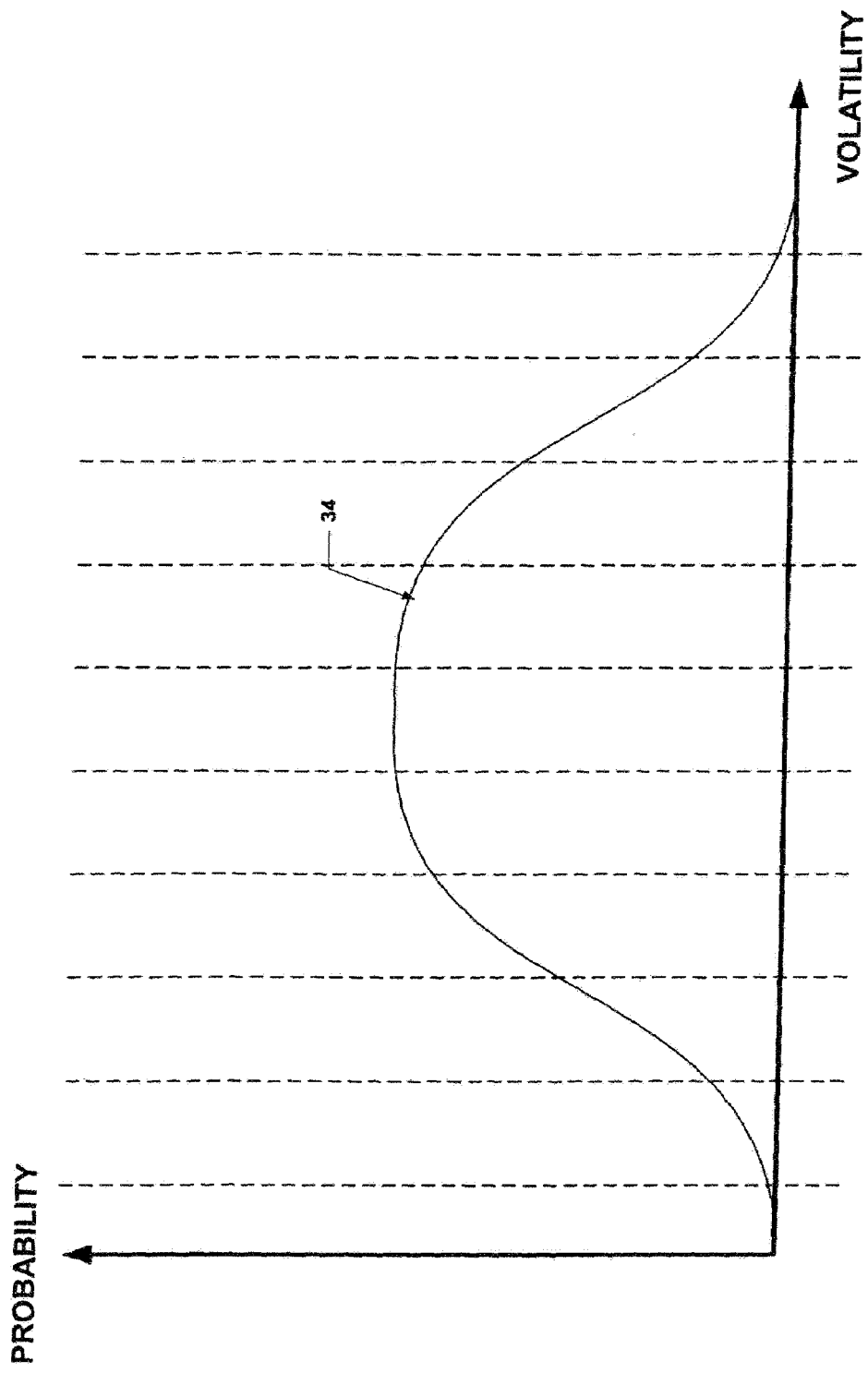
FIG. 2 illustrates a stochastic distribution of interest rate volatility chart.

FIG. 2 represents a volatility probability curve 34 constructed in step 24 of the method illustrated in FIG. 1. A volatility distribution curve 34 is constructed using the average volatility and volatility of volatility determinations in combination with the selected distribution type. The volatility of rates preferably corresponds to the x-axis of the graph. The probability of volatility preferably corresponds to the y-axis of the graph. The average volatility is the weighted center of the curve 34. The graph is then divided into a plurality of vertical slices, as is illustrated in FIG. 2 (Step 26). The area under the curve corresponding to each slice represents the total probability of volatility for the particular volatility associated with the slice.

Referring back to FIG. 1, an option premium is calculated for each slice and is weighed by the corresponding probability (Step 28). In one embodiment, an option premium is calculated for each volatility by employing the "q-model." The "q-model" describes a formula for determining a stochastic volatility premium for a swap option. Q-model value of a call option on rate r with forward value $\bar{r}$, strike k, expiration time t, and annualized volatility σ is given by the following formula:

$$BSQ(\bar{r}, c, \sigma, t) = \bar{r}\frac{1}{q} \cdot \Phi(d_1) + \bar{r}\left(1 - \frac{1}{q} - \tilde{k}\right) \cdot \Phi(d_2)$$

where Φ is the normal cumulative inverse function and $$\tilde{k} = k/\bar{r}$$
$$\tilde{x} = -\frac{1}{q}\ln[(\tilde{k} - 1)q + 1]/(\sigma\sqrt{t})$$
$$d_1 = \tilde{x} + \frac{1}{2}q\sigma\sqrt{t}$$
$$d_2 = \tilde{x} - \frac{1}{2}q\sigma\sqrt{t}$$

The q-model calculates an option premium by linearly interpolating between a lognormal and normal distribution of rates. The probability associated with each volatility as derived from the graph of FIG. 2 is used to weigh each q-model premium. The premiums are then summed up to produce the stochastic volatility premium (Step 30). After the stochastic volatility premium is determined, the volatility premium is optionally inverted back to a standard market volatility by using the known Black method.

For the strike rate that is the same as forward rate, or "at the money," the method of the invention will produce a volatility that is the same as the one produced by the Black model. However, for strike rates that are not equal to the forward rate, the method of the present invention produces a convex curve that is different from the flat curve produced by the Black method.

Figure 3:
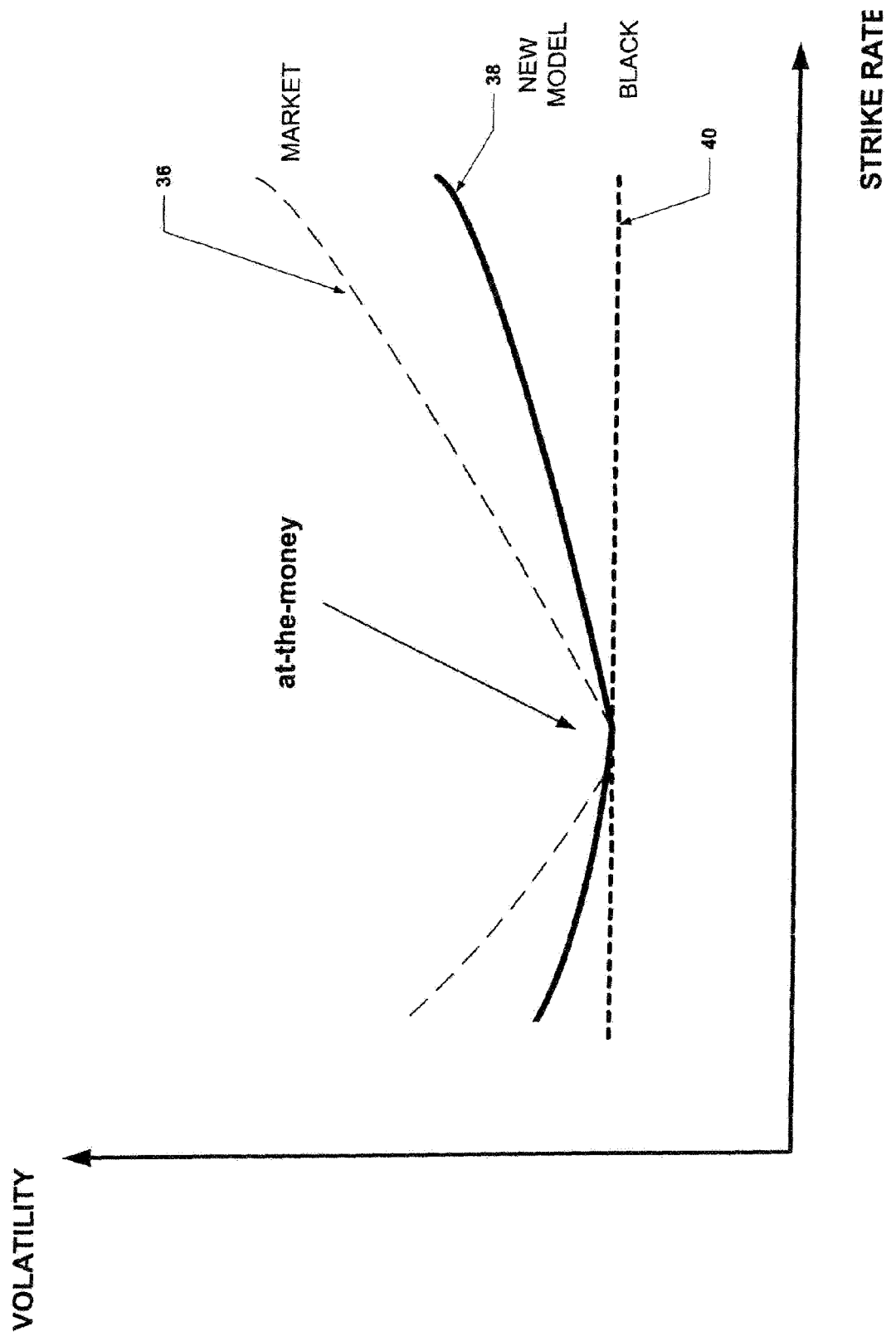
FIG. 3 illustrates the Black volatility model and the model of the invention relative to actual market volatility.

FIG. 3 illustrates volatility curves for the Black method, the method of the invention, and actual market volatility. As may be appreciated the volatility curve produced by the method of the invention 38 is much closer to the market volatility curve 36 then the Black curve 40 when the strike rate moves away from the forward rate. The convex shape of the curve produced by the method of the invention 38 is the result of integrating a lognormal distribution of volatility, where the distribution of the underlying forward rate is a linear interpolation between a lognormal and normal distribution. The magnitude of the dispersion of the distribution of volatility determines the convexity of the curve 38. The distribution of the forward rate (i.e., whether it is lognormal, normal, or somewhere in-between) determines the slope of the curve 38.

Figure 4:
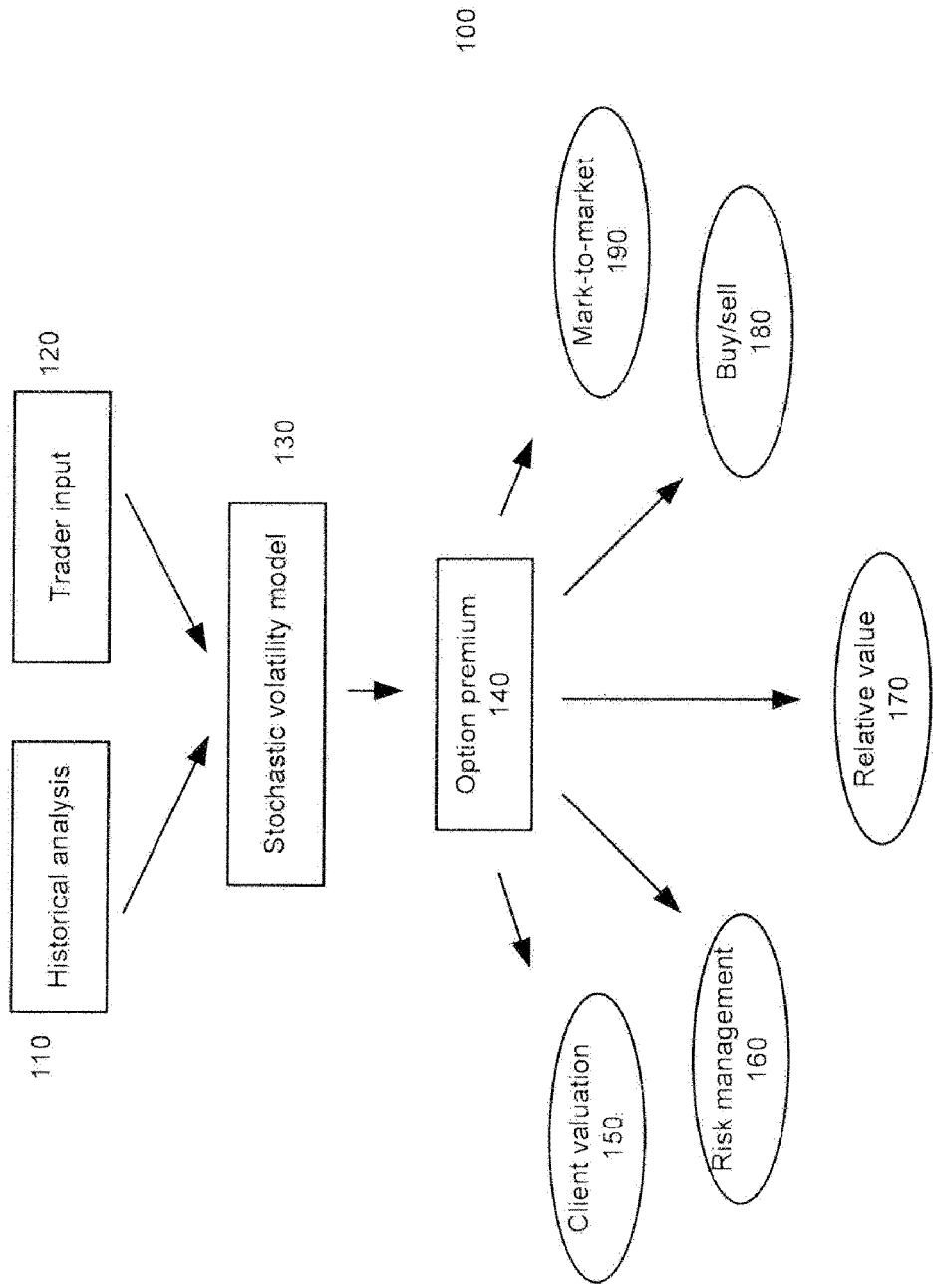
FIG. 4 illustrates a financial decision system implementing a stochastic volatility model.

FIG. 4 illustrates a financial decisioning system 100 for implementing a stochastic volatility model 130 for calculating option premium 140 as will be further described below. Inputs to the system 100 may include historical analysis 110 and trader input 120. The system 100 may implement the calculated option premium 140 for client valuation 150, risk management 160, relative value 170, buy and sell decisioning 180, and mark to market assessment determination 190.

Description of General Use of Model:

The plain vanilla swaption and cap/floor market contains a very wide range of structures, with typical expiries varying from a few months to 10 years or more. Similarly the tenor of the underlying swap into which the swaption is exercised can extend out to 30 years. Finally, while options where the strike rate equals the forward rate (known as "at-the-money" options) are the most common, it is possible to trade options where the strike rate can differ significantly from the forward rate.

However, the information available in the market at any one time concerning the implied volatilities for any of these swaptions is limited to a small number of benchmark expiry/underlying structures, normally with a close to at-the-money strike.

One purpose of this model is to use two intuitive parameters (volatility of volatility and q, both of which can be estimated by the trader or—to some extent—by using historical analysis) to determine where the smile should be trading for any swaption.

Swaption traders can therefore use this model to price less liquid swaption structures where there is limited information available in the market. The resulting option premium can then be used for a number of different purposes.

Valuation of existing client option positions may be provided. Many clients require regular valuations of their open option positions with option counterparties. While these options may have been close to at-the-money when transacted, over the course of time it is likely that the forward rate will move away from the strike rate. As there is often little information available in the market on what value of implied volatility should be used for these options, the stochastic volatility model can be used to provide an option price.

As shown, the system 100 may facilitate risk management 160 of a market maker's portfolio of options. An option market maker's portfolio will typically contain a large number of option positions, with a wide range of expiries, underlying swap tenors and strikes. The speed of execution of the stochastic volatility model provides a quick and intuitive analysis of the smile exposures of the option portfolio.

The system 100 may further provide relative value analysis 170. Prices for different options can be calculated (using consistent assumptions for the volatility and q) using the stochastic volatility model. These prices are then compared to the market prices of these options, and relative value trades set up where the trader buys an option where the market price is below the stochastic volatility price and sells a similar option where the market price is above the stochastic volatility price. The aim of these trades is to make a profit as the market prices of the options tend towards to stochastic volatility prices, with relatively little risk due to the two offsetting option positions.

The system 100 may further be implemented to facilitate buy/sell decisions 180, by comparing the option premium with market price to decide whether to buy or sell option. Using historical analysis or trader inputs, a market maker can options using the stochastic volatility model where there is insufficient information to price options using existing models. The resulting stochastic volatility option price is then compared with the market price to determine whether to buy or sell the option.

Finally, the system 100 may also evaluate market-to-market open option positions 190. The stochastic volatility model may be used to provide a better market-to-market valuation than the existing Black model for options where the strike rate is not equal to the forward rate.

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to the claims that follow.

What is claimed is:

1. A computer system for financial decisioning, the system generating a premium for an option, said option associated with a volatility, a volatility of volatility and a distribution type, said system comprising:

a computer processor programmed to:

receive a volatility distribution based on said volatility, said volatility of volatility, and said distribution type;

divide the volatility distribution into a plurality of portions, each said portion corresponding to a volatility, each said portion being associated with a probability;

determine an option premium for each volatility portion by employing a volatility premium calculation with rate r with forward value $\bar{r}$, strike k, expiration time t, and annualized volatility σ according to the following formula:

$$BSQ(\bar{r}, c, \sigma, t) = \bar{r}\frac{1}{q} \cdot \Phi(d_1) + \bar{r}\left(1 - \frac{1}{q} - \tilde{k}\right) \cdot \Phi(d_2)$$

Where Φ is the normal cumulative inverse function and $$\tilde{k} = k/\bar{r}$$
$$\tilde{x} = -\frac{1}{q}\ln[(\tilde{k}-1)q + 1]/(\sigma\sqrt{t})$$
$$d_1 = \tilde{x} + \frac{1}{2}q\sigma\sqrt{t}$$
$$d_2 = \tilde{x} - \frac{1}{2}q\sigma\sqrt{t}$$

weigh each option premium by the probability associated with said volatility portion; and sum all weighed premiums associated with said volatility portions to provide a premium for the option.

2. The system of claim 1, wherein the processor is further programmed to perform an inverse Black procedure to determine the conventional market implied volatility for a strike rate that is different from the forward rate.

3. The system of claim 2, wherein the processor is further programmed to compute the market price based on the conventional market implied volatility and comparing the generated premium to the market price.

4. The system of claim 3, wherein the processor is further programmed to generate a decision to buy or sell the option based on the comparison.

* * * * *